April 12, 1927.
G. L. FORD
DIBBLE
Filed Aug. 6, 1925
1,624,488
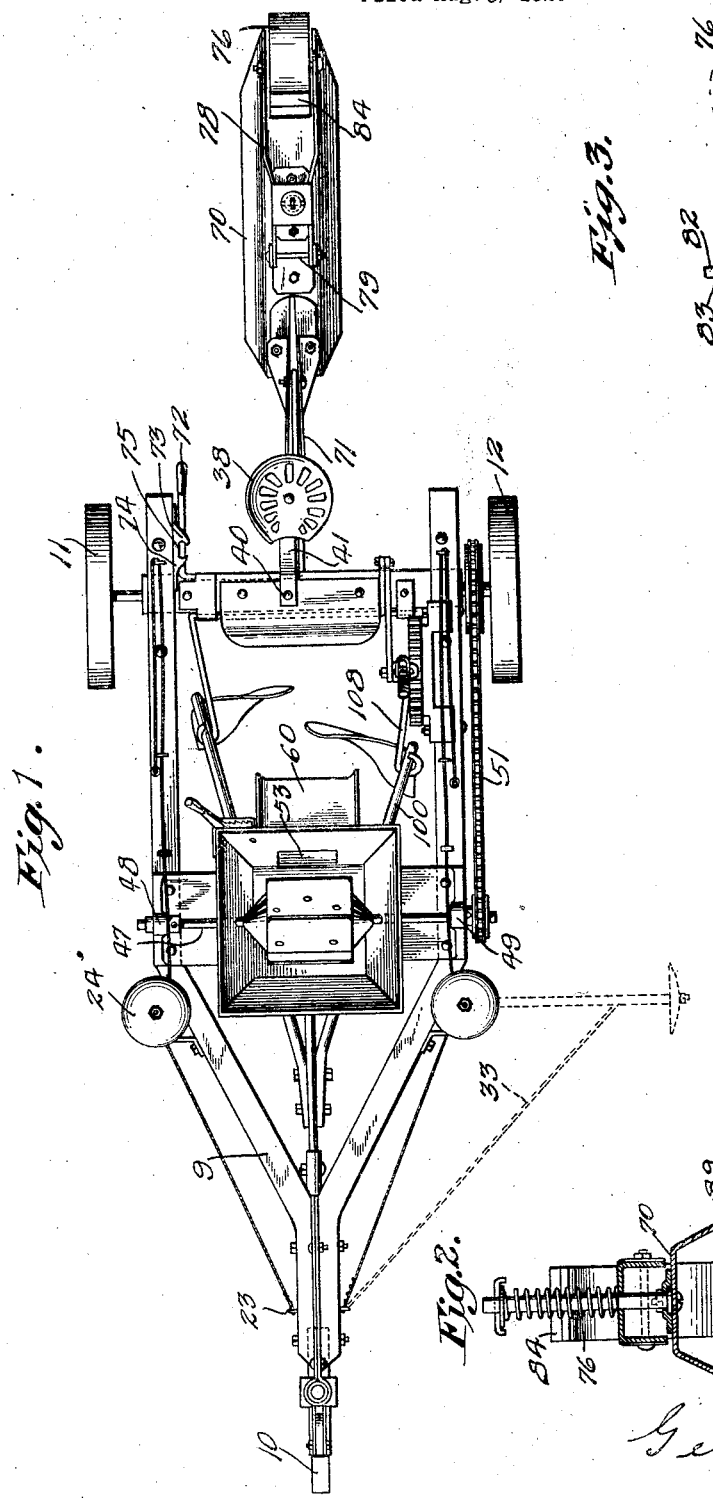
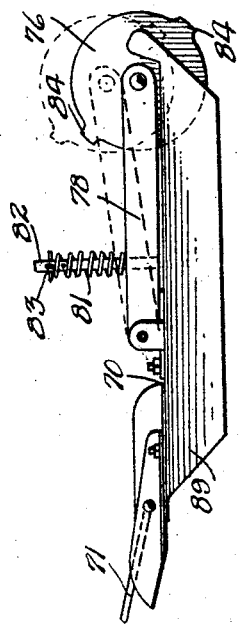
Inventor.
Geo. L. Ford Patented Apr. 12, 1927.

1,624,488

UNITED STATES PATENT OFFICE.

GEORGE L. FORD, OF JAVA, VIRGINIA.

DIBBLE.

Application filed August 6, 1925. Serial No. 48,500.

The present invention relates to agricultural implements and particularly to a dibble, which may be used in combination with a plow and fertilizer distributor.

An object of the invention is to provide such a dibble particularly adapted for use in connection with cotton and tobacco planting, though it will be obvious that the invention is adapted for other uses as well.

Other objects and advantages of the invention will appear from the following description taken in connection with the accompanying drawings, which illustrate a preferred form or embodiment of the invention, but which are not to be taken as a definition of the limits of the invention, reference being had to the appended claims for that purpose.

In the drawings:

Fig. 1 is a top plan view on a reduced scale showing an entire plow and dibble connected thereto;

Fig. 2 is a vertical end view of the dibble partly in section;

Fig. 3 is a side elevation of the dibble.

Referring in detail to the drawings, in Fig. 1 is shown the dibble 70 associated with a plow including variably positionable plow shares, a fertilizer distributor, and row gauges, the dibble being attached by means of a drawbar 71 to the rear axle 39 of the plow. A lever 72 is provided at the rear end of the plow frame 9 adjacent the operator's seat and is adapted to engage the drawbar 71 for the purpose of raising and lowering the dibble 70 to inoperative and operative positions, respectively, the lever 72, in the operative position of the dibble, being engageable between two projections 73 and 74 on a plate 75 bolted to the frame 9.

As shown in the drawings, the dibble preferably includes a spacer wheel 76 revolubly journaled in a pair of horizontal parallel side plates 78 which are pivoted by a bolt 79 to the dibble frame, the plates 78 being connected across their tops by a spring abutment plate 80, against which bears the lower end of a coil compression spring 81 encircling an upright post 82 provided in the dibble frame, said spring bearing at its upper end against a stop pin 83 passing through the upper end of the post. The effect of the spring is to urge downwardly the side plates 78 and, consequently, the dibble wheel 76. The wheel 76 is provided with plant spacing projections 84 extending across its periphery for the purpose of making depressions in the soil at regular intervals. The spring 81 permits the upward yielding of the dibble wheel when it encounters any obstruction in the soil, but causes it at all other times to bear on and be pressed into the soil, and particularly into the bed prepared by the plows, thus providing at regular intervals a series of depressions in which plants may be deposited. The dibble frame 70 is provided, as shown in the drawings, with guiding and bed smoothing extensions 89 for the purpose of smoothing the bed prepared by the plows prior to the operation of the dibble wheel.

These extensions 89, while smoothing the ground preparatory to planting, also tend to form a slight ridge of pulverized soil. The rotary dibble wheel 76 contacts with this ridge and forms plant or seed receiving holes wherever the projections 84 on the periphery of the wheel contact with the ridges.

By the invention there is thus provided a dibble which may be used in combination with other agricultural implements, such as the plow and fertilizer distributor shown, or which may be used alone; and that the dibble of the present invention is provided with a rugged frame including ridge forming members particularly desirable in cotton and tobacco planting, and with a revoluble dibble wheel yieldably mounted and constantly urged downwardly into contact with the ground.

What is claimed is:

1. A dibble comprising a frame member having depending ridge forming members contacting with the ground, said frame member having lug members forming a journal, parallel bars journaled in said lugs, a revoluble dibble wheel journaled between the open ends of said bars, and yieldable means carried by said frame for urging said dibble wheel to contact with the ground.

2. A dibble comprising a pair of ridge forming members contacting with the ground, a revoluble dibble wheel mounted between and in the rear of said members, and means for yieldingly urging said dibble wheel downwardly.

GEO. L. FORD.